(12) United States Patent  
Wu et al.

(10) Patent No.: US 12,341,661 B2
(45) Date of Patent: Jun. 24, 2025

(54) TRAFFIC MESSAGE FORWARDING METHOD, AND CLIENT, CONTROLLER AND STORAGE MEDIUM

(71) Applicant: ZTE CORPORATION, Shenzhen (CN)

(72) Inventors: Haisheng Wu, Shenzhen (CN); Ran Chen, Shenzhen (CN); Weibao Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/555,925

(22) PCT Filed: May 17, 2022

(86) PCT No.: PCT/CN2022/093301
§ 371 (c)(1),
(2) Date: Oct. 18, 2023

(87) PCT Pub. No.: WO2022/247689
PCT Pub. Date: Dec. 1, 2022

(65) Prior Publication Data
US 2024/0205087 A1    Jun. 20, 2024

(30) Foreign Application Priority Data
May 24, 2021 (CN) .......................... 202110564009.5

(51) Int. Cl.
*H04L 41/0893* (2022.01)
*H04L 9/40* (2022.01)
(Continued)

(52) U.S. Cl.
CPC .......... *H04L 41/0893* (2013.01); *H04L 45/34* (2013.01); *H04L 45/74* (2013.01); *H04L 63/0227* (2013.01)

(58) Field of Classification Search
None
See application file for complete search history.

(56) References Cited

U.S. PATENT DOCUMENTS

2011/0149734 A1    6/2011   Park et al.
2019/0028381 A1    1/2019   Li et al.
(Continued)

FOREIGN PATENT DOCUMENTS

CN    107222449 A    9/2017
CN    107517488 A    12/2017
(Continued)

OTHER PUBLICATIONS

International Searching Authority. International Search Report and Written Opinion for PCT Application No. PCT/CN2022/093301 and English translation, mailed Jul. 27, 2022, pp. 1-10.

(Continued)

*Primary Examiner* — Fadi Haj Said
(74) *Attorney, Agent, or Firm* — Vivacqua Crane, PLLC

(57) ABSTRACT

Disclosed are a traffic message forwarding method, a client, a controller, and a storage medium. The traffic message forwarding method may includes: receiving a traffic message; determining, in response to the traffic message comprising a block resource identifier, a target block resource according to the block resource identifier and filtering rule information, wherein the filtering rule information is received from a border gateway controller; and forwarding the traffic message using the target block resource.

16 Claims, 7 Drawing Sheets

(51) Int. Cl.
  *H04L 45/00* (2022.01)
  *H04L 45/74* (2022.01)

(56) References Cited

U.S. PATENT DOCUMENTS

| | | | |
|---|---|---|---|
| 2019/0124704 A1* | 4/2019 | Sun | H04L 47/24 |
| 2019/0349307 A1 | 11/2019 | Wu et al. | |
| 2021/0243107 A1* | 8/2021 | Retana | H04L 45/04 |
| 2021/0314819 A1 | 10/2021 | Dong et al. | |
| 2021/0409333 A1* | 12/2021 | Barritt | H04L 47/17 |
| 2023/0261995 A1 | 8/2023 | Xiong et al. | |

FOREIGN PATENT DOCUMENTS

| | | |
|---|---|---|
| CN | 108347376 A | 7/2018 |
| CN | 109218201 A | 1/2019 |
| CN | 111865898 A | 10/2020 |
| CN | 112165725 A | 1/2021 |
| CN | 112511329 A | 3/2021 |

OTHER PUBLICATIONS

European Patent Office. Extended European Search Report for EP Application No. 22810416.2, mailed Jul. 30, 2024, pp. 1-8.

\* cited by examiner

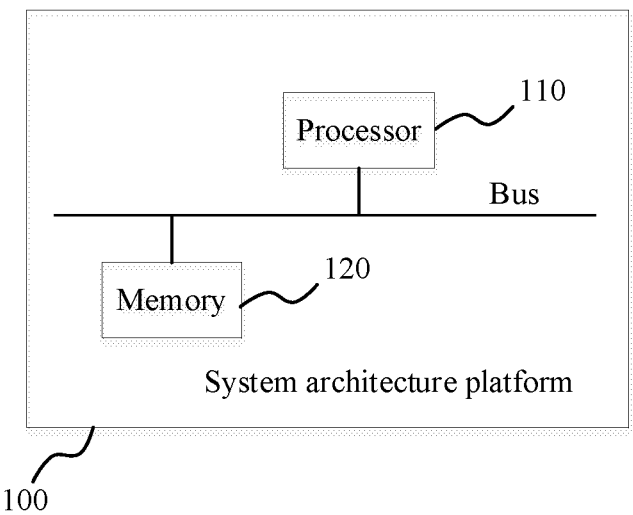
FIG. 1
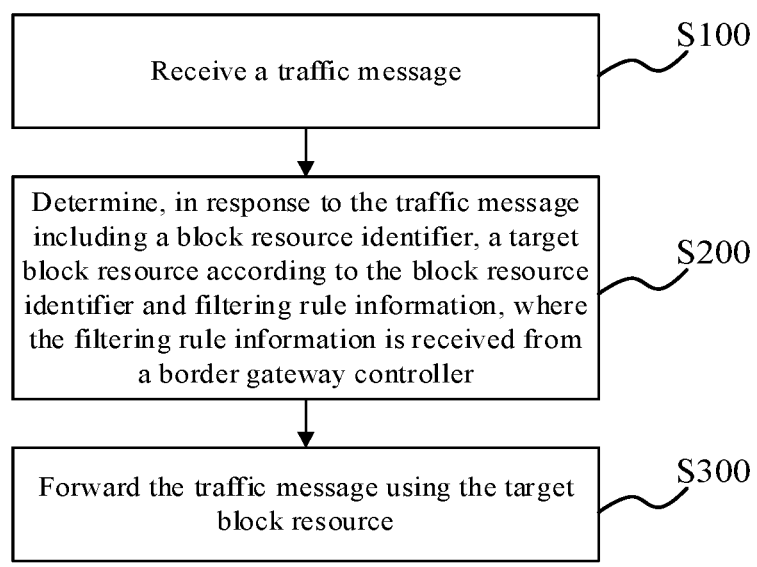
FIG. 2
| 0 | 1 | 2 | 3 | 4 | 5 | 6 | 7 |
|---|---|---|---|---|---|---|---|
| e | a | len | | 0 | lt | gt | eq |
FIG. 3

| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|
| Type=TBD1 ||||||||  Type=TBD1  ||||||||  Type=TBD1  |||||||| Type of slice identifier ||||||||
| Slice identifier ||||||||||||||||||||||||||||||||
| SUB-TLV Format (Variable length) ||||||||||||||||||||||||||||||||

FIG. 4

| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|
| SUB-TYPE |||||||| LENGTH ||||||||||||||||||||||||
| Value(Variable length) ||||||||||||||||||||||||||||||||

FIG. 5

| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|
| Type=TBD1 |||||||| Flags (1 octet) |||||||| Reserve ||||||||||||||||
| Application identifier ||||||||||||||||||||||||||||||||
| Path Length ||||||||||||||||||||||||||||||||
| SUB-TLV Format (Variable length) ||||||||||||||||||||||||||||||||

FIG. 6

TRAFFIC MESSAGE FORWARDING METHOD, AND CLIENT, CONTROLLER AND STORAGE MEDIUM

CROSS-REFERENCE TO RELATED APPLICATION

This application is a national stage filing under 35 U.S.C. § 371 of international application number PCT/CN2022/093301, filed May 17, 2022, which claims priority to Chinese patent application No. 202110564009.5, filed May 24, 2021. The contents of these applications are incorporated herein by reference in their entirety.

TECHNICAL FIELD

Embodiments of the present disclosure relate to, but not limited to, the field of communication, and in particular to a traffic message forwarding method, a client, a controller, and a storage medium.

BACKGROUND

Conventional routing is originally designed for traffic forwarding, and the routing table entry only contains prefix mask information for destination address matching and traffic outbound interface information. With the development of network services, the network complexity increases, and the requirements for routing are getting higher and higher. Usually, information about supporting a traffic policy is added in the routing table entry, i.e., the data flow in the forwarding routing table entry is further classified. However, the routing of the information about supporting the traffic policy is a local behavior and needs to be configured for each device. Manual configuration requires a large amount of work and poses high requirements for operation and maintenance personnel. Especially in 5G network applications, flexible scheduling and massive connections are required. Existing routing technologies cannot meet the requirements of customers for traffic path adjustment and optimization.

SUMMARY

The following is a summary of the subject matter set forth in the description. This summary is not intended to limit the scope of protection of the claims.

Embodiments of the present disclosure provide a traffic message forwarding method, a client, a controller, and a storage medium.

In accordance with a first aspect of the present disclosure, an embodiment provides a traffic message forwarding method, including: receiving a traffic message; determining, in response to the traffic message including a block resource identifier, a target block resource according to the block resource identifier and filtering rule information, where the filtering rule information is received from a border gateway controller; and forwarding the traffic message using the target block resource.

In accordance with a second aspect of the present disclosure, an embodiment further provides a border gateway client, including: a memory, a processor, and a computer program stored in the memory and executable by the processor, where the computer program, when executed by the processor, causes the processor to implement the traffic message forwarding method in accordance with the first aspect.

In accordance with a third aspect of the present disclosure, an embodiment further provides a traffic message forwarding method, including: sending filtering rule information carrying a block resource identifier to a border gateway client, such that the border gateway client determines a target block resource of a traffic message according to the filtering rule information, and forwards on the traffic message according to the target block resource, where the traffic message is received by the border gateway client.

In accordance with a fourth aspect of the present disclosure, an embodiment further provides a border gateway controller, including: a memory, a processor, and a computer program stored in the memory and executable by the processor, where the computer program, when executed by the processor, causes the processor to implement the traffic message forwarding method in accordance with the third aspect.

In accordance with a fifth aspect of the present disclosure, an embodiment further provides a computer-readable storage medium, storing a computer-executable instruction which, when executed by a processor, causes the processor to implement the traffic message forwarding method in accordance with the first aspect or the traffic message forwarding method in accordance with the third aspect.

Additional features and advantages of the disclosure will be set forth in the description which follows, and in part will be obvious from the description, or may be learned by the practice of the disclosure. The objects and other advantages of the present disclosure can be realized and obtained by the structures particularly pointed out in the description, claims and accompanying drawings.

BRIEF DESCRIPTION OF DRAWINGS

FIG. 1 is a schematic diagram of a system architecture configured for executing a traffic message forwarding method according to an embodiment of the present disclosure;

FIG. 2 is a flowchart of a traffic message forwarding method at a border gateway client side according to an embodiment of the present disclosure;

FIG. 3 is a schematic diagram of an encapsulation format of a slice BGP Flowspc Component type in a traffic message forwarding method at a border gateway client side according to an embodiment of the present disclosure;

FIG. 4 is a schematic diagram of a community attribute format of a slice identifier in a traffic message forwarding method at a border gateway client side according to an embodiment of the present disclosure;

FIG. 5 is a schematic diagram of a sub-Type Length Value (SUB-TLV) format of a community attribute format in a traffic message forwarding method at a border gateway client side according to an embodiment of the present disclosure;

FIG. 6 is a schematic diagram of a community attribute format of a slice identifier in a traffic message forwarding method at a border gateway client side according to an embodiment of the present disclosure;

DETAILED DESCRIPTION

Figure 7:
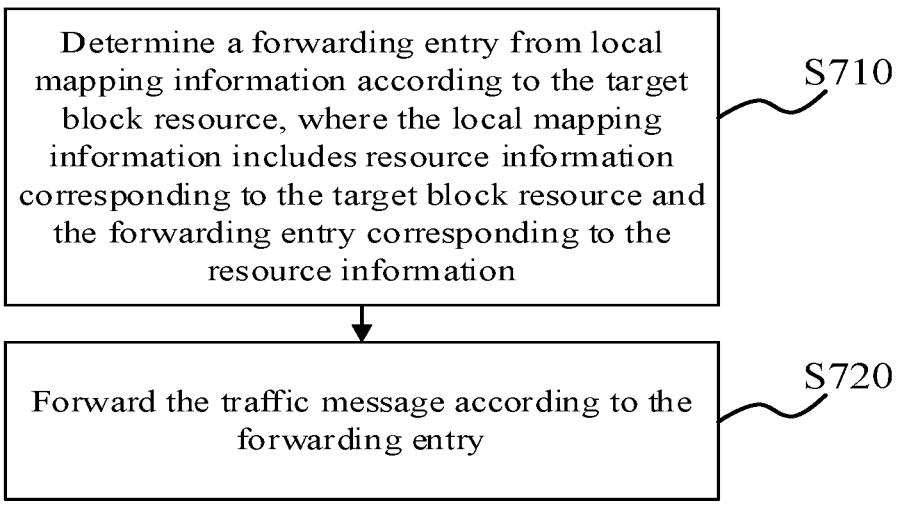
FIG. 7 is a flowchart of forwarding processing in a traffic message forwarding method at a border gateway client side according to an embodiment of the present disclosure.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

Embodiments of the present disclosure provide a traffic message forwarding method, a client, a controller, and a storage medium. The traffic message forwarding method includes, but not limited to, the following steps: receiving a traffic message; determining, when the traffic message includes a block resource identifier, a target block resource according to the block resource identifier and filtering rule information, where the filtering rule information is received from a border gateway controller; and forwarding the traffic message using the target block resource. According to the technical schemes of the embodiments of the present disclosure, when receiving a traffic message carrying a block resource identifier, the border gateway client can determine a target block resource according to the block resource identifier and filtering rule information received from the border gateway controller, and then forward the traffic message using the target block resource. Network resources can be segmented flexibly using the block resource identifier, so that the traffic message can be forwarded using the target block resource determined according to the block resource identifier, thereby meeting users' requirements for traffic path adjustment and optimization.

The embodiments of the present disclosure will be further described in detail below in conjunction with the accompanying drawings.

As shown in FIG. 1, FIG. 1 is a schematic diagram of a system architecture platform 100 configured for executing a traffic message forwarding method according to an embodiment of the present disclosure.

In the example of FIG. 1, the system architecture platform 100 includes a processor 110 and a memory 120. The processor 110 and the memory 120 may be connected by a bus or in other ways. Connection by a bus is taken as an example in FIG. 1.

The memory 120, as a non-transitory computer-readable storage medium, may be configured for storing a non-transitory software program and a non-transitory computer-executable program. In addition, the memory 120 may include a high-speed random access memory, and may also include a non-transitory memory, e.g., at least one magnetic disk storage device, flash memory device, or other non-transitory solid-state storage device. In some implementations, the memory 120 may include memories located remotely from the processor 110, and the remote memories may be connected to the system architecture platform via a network. Examples of the network include, but not limited to, the Internet, an intranet, a local area network, a mobile communication network, and combinations thereof.

It can be understood by those having ordinary skills in the art that the system architecture platform may be applied to communication network systems, future evolved mobile communication network systems, etc., which is not particularly limited in this embodiment.

Those having ordinary skills in the art may understand that the system architecture platform shown in FIG. 1 does not constitute a limitation to the embodiments of the present disclosure, and more or fewer components than those shown in the figure may be included, or some components may be combined, or a different component arrangement may be used.

In the system architecture platform shown in FIG. 1, the processor 110 may call a service flow management program stored in the memory 120 to execute a traffic message forwarding method.

Based on the above-mentioned system architecture platform, various embodiments of the traffic message forwarding method of the present disclosure are proposed.

As shown in FIG. 2, FIG. 2 is a flowchart of a traffic message forwarding method according to an embodiment of the present disclosure. The traffic message forwarding method is applied to a border gateway client, and includes, but not limited to, steps S100, S200, and S300.

At S100, a traffic message is received.

At S200, when the traffic message includes a block resource identifier, a target block resource is determined according to the block resource identifier and filtering rule information, where the filtering rule information is received from a border gateway controller.

At S300, the traffic message is forwarded using the target block resource.

When receiving a traffic message carrying a block resource identifier, the border gateway client can determine a target block resource according to the block resource identifier and filtering rule information received from the border gateway controller, and then forward the traffic message using the target block resource. Network resources can be segmented flexibly using the block resource identifier, so that the traffic message can be forwarded using the target block resource determined according to the block resource identifier, thereby meeting users' requirements for traffic path adjustment and optimization.

In an embodiment, the border gateway client can be applied to the Border Gateway Protocol Flow Specification (BGP Flowspc) of 5G networks. To improve the capability of traffic path adjustment and optimization, the BGP Flowspc can be optimized. Filtering rule information in the BGP Flowspc is extended by adding a block resource identifier into a filtering rule. To be specific, the border gateway controller sends filtering rule information carrying a block resource identifier to the border gateway client. After receiving the filtering rule information carrying the block resource identifier, the border gateway client installs the filtering rule information into local mapping information. After receiving a traffic message carrying a block resource identifier, the border gateway client can determine a target block resource according to the block resource identifier in the traffic message and the local mapping information installed with the filtering rule information, and then forward the traffic message using the target block resource. Network resources can be segmented flexibly using the block resource identifier, so that the traffic message can be forwarded using the target block resource determined according to the block resource identifier, thereby meeting users' requirements for traffic path adjustment and optimization.

It should be noted that the block resource identifier may be a slice identifier or an application identifier, which is not particularly limited in this embodiment.

It should be noted that the filtering rule information includes matching condition information and execution action information. The matching condition information is carried in Network Layer Reachability Information (NLRI) of the filtering rule. The execution action information is an execution action following traffic matching. The execution action information is carried by an extended community attribute in the filtering rule.

It should be noted that the block resource identifier is carried by the matching condition information or the execution action information, which is not particularly limited in this embodiment.

It should be noted that the matching condition information may be existing defined flow specification component type information, where the flow specification component type information may be understood as matching of traffic based on a source address/destination address/Differentiated Services Code Point (DSCP) of a data packet; or the matching condition information may be information obtained by extending a BGP Flowspc component type to carry a slice identifier/application identifier, where the slice identifier/application identifier is used for supporting filtering of a slice/application.

It should be noted that multiple groups of slice identifiers/application identifiers may be carried in the extended BGP Flowspc component type, i.e., a slice identifier list or an application identifier list may be set. In this way, during matching, the matching may be performed for a plurality of slice sources or a plurality of application sources, and there is no need to deliver a plurality of traffic rules (matching condition information), thereby reducing memory overheads.

It should be noted that redirected extended community attribute information may be redirected to a universal slice identifier or application identifier or a path in the universal slice identifier or application identifier, for example, a Segment Routing Policy (SR-Policy), a Segmental Routing-Traffic Engineering (SR-TE) tunnel, or a Segment Routing Transport Profile-Traffic Engineering (SR-TP) tunnel.

It should be noted that the new redirected extended community attribute information mainly carries a slice identifier/application identifier and a specific identifier of a path. Identifiers of the SR-TE tunnel and the SR-TP tunnel are each a Tunnel-Identity Document (Tunnel-ID). An identifier of the SR-policy is a triplet, which includes a destination address, a color attribute, and a prefix Security Identifier (SID).

A BGP Flowspc client may receive Flowspc routing information carrying the extended community attribute information, and then save contents of a flow filtering rule in the Flowspc routing information. The BGP Flowspc client searches for a forwarding entry in local mapping information according to the slice identifier/application identifier (for scenarios where no path is specified), which may be realized through an existing redirection to a next hop action. Alternatively, the BGP Flowspc client can directly find the corresponding forwarding entry for forwarding according to a path in the slice identifier/application identifier.

It should be noted that the forwarding entry in the local mapping information of the BGP Flowspc client may be established based on an inter-autonomous-system routing protocol, an Interior Gateway Protocol (IGP), a Label Distribution Protocol (LDP), a Segmental Routing Protocol (SR), a Resource ReSerVation Protocol (RSVP), or other models.

In an embodiment, a BGP Flowspc Component type can be extended to the following encapsulation formats:

1) Slice BGP Flowspc Component type.

Encapsulation <Type (1 octet), [Operator, Value]+>, as shown in FIG. 3.

The Value field carries a slice identifier.

It should be noted that the slice identifier may be a slice identity, a multi-topology identifier, a Flexible-Algorithm (Flex-Algo) identifier, or a virtual topology identifier.

2) Application BGP Flowspc Component type.

Encapsulation <Type (1 octet), [Operator, Value]+>, as shown in FIG. 3.

The Value field carries an application identifier.

In an embodiment, for the extended redirected extended community attribute information, the community attribute information is used for carrying a specific action attribute.

1) An extended community attribute information format redirected to a general slice identifier is shown in FIG. 4.

Types of the slice identifier in the community attribute information are as follows:
1. slice identity;
2. multi-topology identifier;
3. Flex-Algo identifier; and
4. virtual topology identifier.

A SUB-TLV format in the community attribute information is shown in FIG. 5.

SUB-TYPE in the SUB-TLV may include:
1. RSVP-TE tunnel;
2. SR-TP/SR-TE tunnel; and
3. SR-Policy.

Value in the SUB-TLV is as follows:
1. RSVP-TE tunnel ID or triplet (tunnel ID, head node router ID (RouterID), tail node RouterID);
2. SR-TP/SR-TE tunnel ID or triplet (tunnel ID, head node router ID (RouterID), tail node RouterID); and
3. SR-Policy ID or triplet (SR-Policy Color, SR-Policy Endpoint, SR-Policy Prefix-SID).

As shown in FIG. 4 to FIG. 5, a path in a slice may be redirected to. The specific path is carried by the SUB-TLV field. In the SUB-TLV, SUB-TYPE may be an SR-Policy, an SR-TE tunnel, an SR-TP tunnel, or an RSVP-TE tunnel; and Value may correspond to a specific keyword identifier of the SR-Policy/SR-TE tunnel/SR-TP tunnel/RSVP-TE tunnel.

2) An extended community attribute information format redirected to a general application identifier is shown in FIG. 6.

It should be noted that an SUB-TLV format in the extended community attribute information for redirection to the application identifier is consistent with the SUB-TLV format in the extended community attribute information for redirection to the slice identifier.

Referring to FIG. 7, S300 includes, but not limited to, steps S710, S720, and S730.

At S710, a forwarding entry is determined from local mapping information according to the target block resource, where the local mapping information includes resource information corresponding to the target block resource and the forwarding entry corresponding to the resource information.

At S720, the traffic message is forwarded according to the forwarding entry.

The border gateway client can determine a forwarding entry from local mapping information according to the target block resource, and then forward the traffic message according to the forwarding entry, where the local mapping information includes resource information corresponding to the target block resource and the forwarding entry corresponding to the resource information. Network resources can be segmented flexibly using the block resource identifier, so that the traffic message can be forwarded using the target block resource determined according to the block resource identifier, thereby meeting users' requirements for traffic path adjustment and optimization.

In an embodiment, when the traffic message includes community attribute information, the border gateway client can determine the forwarding entry from the local mapping information according to the target block resource and the community attribute information, and then forward the traffic message according to the forwarding entry, where the local mapping information includes resource information corresponding to the target block resource and the forwarding entry corresponding to the resource information. Network resources can be segmented flexibly using the block resource identifier, so that the traffic message can be forwarded using the target block resource determined according to the block resource identifier, thereby meeting users' requirements for traffic path adjustment and optimization.

Figure 8:
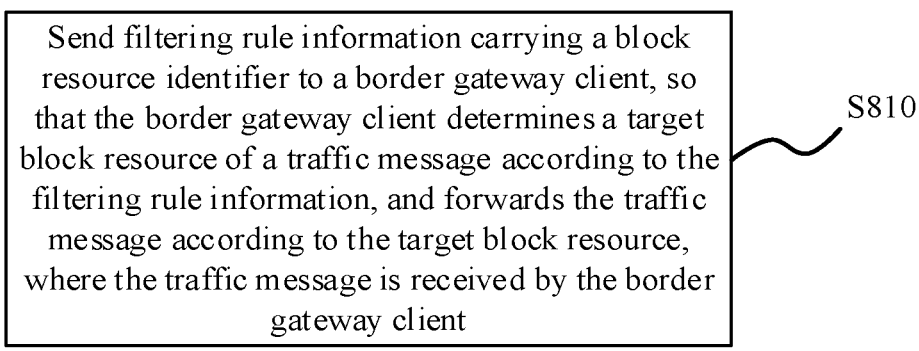
FIG. 8 is a flowchart of a traffic message forwarding method at a border gateway controller side according to an embodiment of the present disclosure.

As shown in FIG. 8, FIG. 8 is a flowchart of a traffic message forwarding method according to an embodiment of the present disclosure. The traffic message forwarding method is applied to a border gateway controller, and includes, but not limited to a step S810.

At S810, filtering rule information carrying a block resource identifier is sent to a border gateway client, so that the border gateway client determines a target block resource of a traffic message according to the filtering rule information, and forwards the traffic message according to the target block resource, where the traffic message is received by the border gateway client.

The border gateway controller may send the filtering rule information carrying the block resource identifier to the border gateway client, so that the border gateway client installs a filtering rule into local mapping information. When receiving the traffic message carrying the block resource identifier, the border gateway client can determine the target block resource of the traffic message according to the filtering rule information and the block resource identifier, and then forward the traffic message according to the target block resource. Network resources can be segmented flexibly using the block resource identifier, so that the traffic message can be forwarded using the target block resource determined according to the block resource identifier, thereby meeting users' requirements for traffic path adjustment and optimization.

It should be noted that the block resource identifier may be a slice identifier or an application identifier, which is not particularly limited in this embodiment.

It should be noted that the filtering rule information includes matching condition information and execution action information. The matching condition information is carried in NLRI of the filtering rule. The execution action information is an execution action following traffic matching. The execution action information is carried by an extended community attribute in the filtering rule.

It should be noted that the block resource identifier is carried by the matching condition information or the execution action information, which is not particularly limited in this embodiment.

Figure 9:
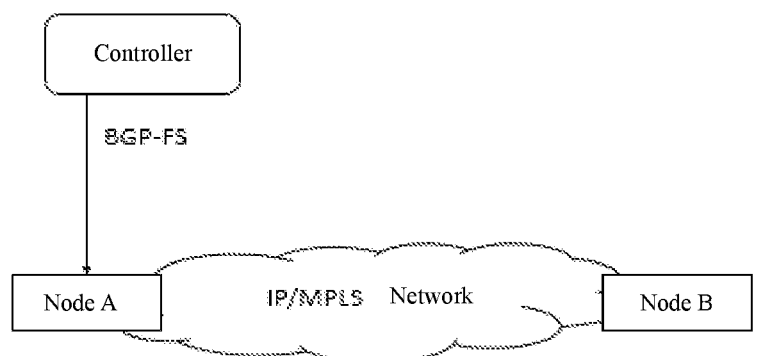
FIG. 9 is a schematic diagram of a traffic message forwarding network according to an embodiment of the present disclosure.
Figure 10:
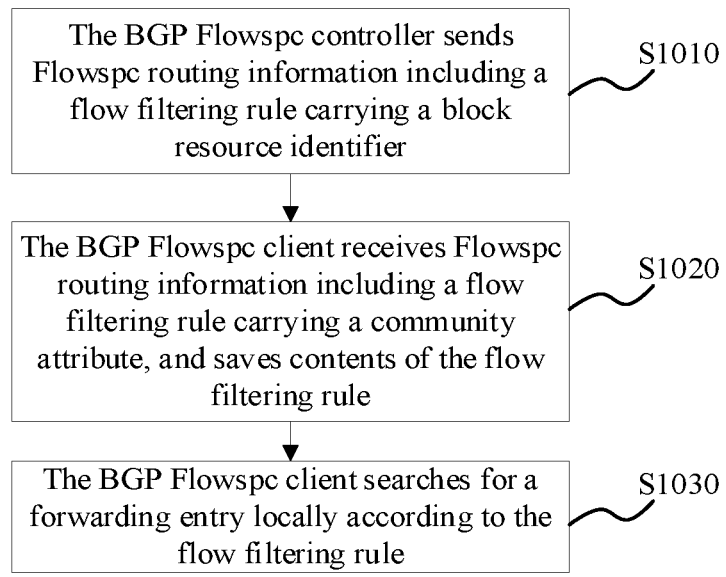
FIG. 10 is a flowchart of a traffic message forwarding method according to an embodiment of the present disclosure.

As shown in FIG. 9, FIG. 9 is a schematic diagram of a traffic message forwarding network according to an embodiment of the present disclosure. The network includes a BGP Flowspc controller (equivalent to a border gateway controller) and a node A (equivalent to a border gateway client). The node A may transmit a traffic message to the node B through an Internet Protocol/Multiprotocol Label Switching (IP/MPLS) network. FIG. 10 is a flowchart of a traffic message forwarding method according to an embodiment of the present disclosure. The traffic message forwarding method is applied to the network of FIG. 9, and includes, but not limited to, steps S1010, S1020, and S1030.

At S1010, the BGP Flowspc controller sends Flowspc routing information including a flow filtering rule carrying a block resource identifier.

It should be noted that the block resource identifier is consistent with that in the above embodiments, so the details will not be repeated herein.

At S1020, the BGP Flowspc client receives Flowspc routing information including a flow filtering rule carrying a community attribute, and saves contents of the flow filtering rule.

The flow filtering rule includes two parts: matching condition information and execution action information.

The execution action information is carried by extended community attribute information.

At S1030, the BGP Flowspc client searches for a forwarding entry locally according to the flow filtering rule.

It should be noted that the BGP Flowspc client searches for the forwarding entry in a local mapping table according to a slice identifier, an application identifier, a slice identifier list, or an application identifier list, or directly performs forwarding according to a specific path in the extended community attribute information.

It should be noted that the forwarding entry in local mapping information of the BGP Flowspc client may be established based on a BGP, IGP, LDP, SR, RSVP, or YANG model, or other models.

Figure 11:
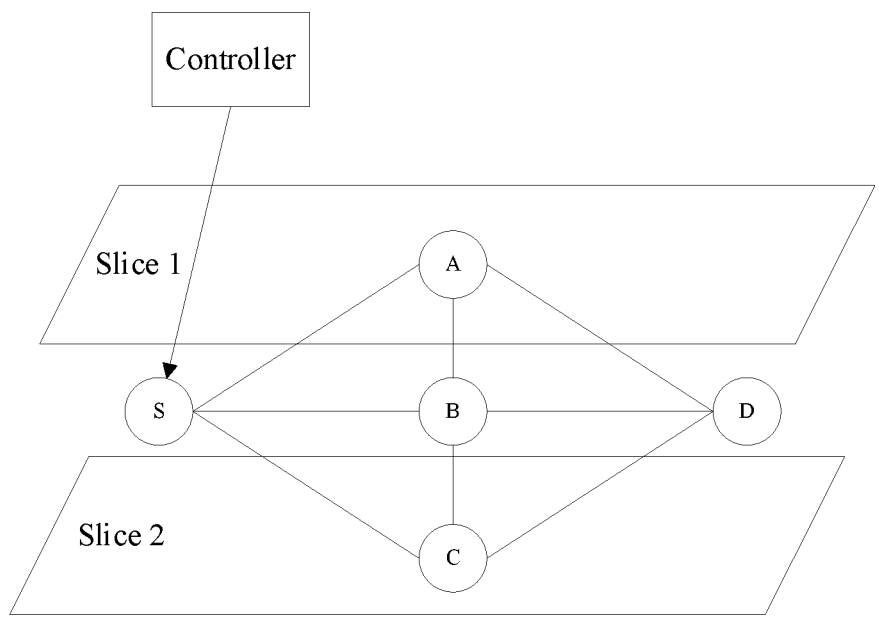
FIG. 11 is a schematic diagram of a traffic message forwarding network for redirecting to a slice according to an embodiment of the present disclosure.

As shown in FIG. 11, FIG. 11 is a schematic diagram of a traffic message forwarding network for redirecting to a slice according to an embodiment of the present disclosure. Nodes and a controller (equivalent to a border gateway controller) in the network all have a BGP Flowspc function. The network is provided with two slices, namely, a slice 1 and a slice 2. The slice 1 includes nodes S, A, B, and D, and bidirectional links connected between these nodes. The slice 2 includes nodes S, B, C, and D, and bidirectional links connected between these nodes. Each slice has a corresponding forwarding path, and a head node S (equivalent to a border gateway client) may transmit a traffic message to the node D through the slice 1 and/or the slice 2.

Figure 12:
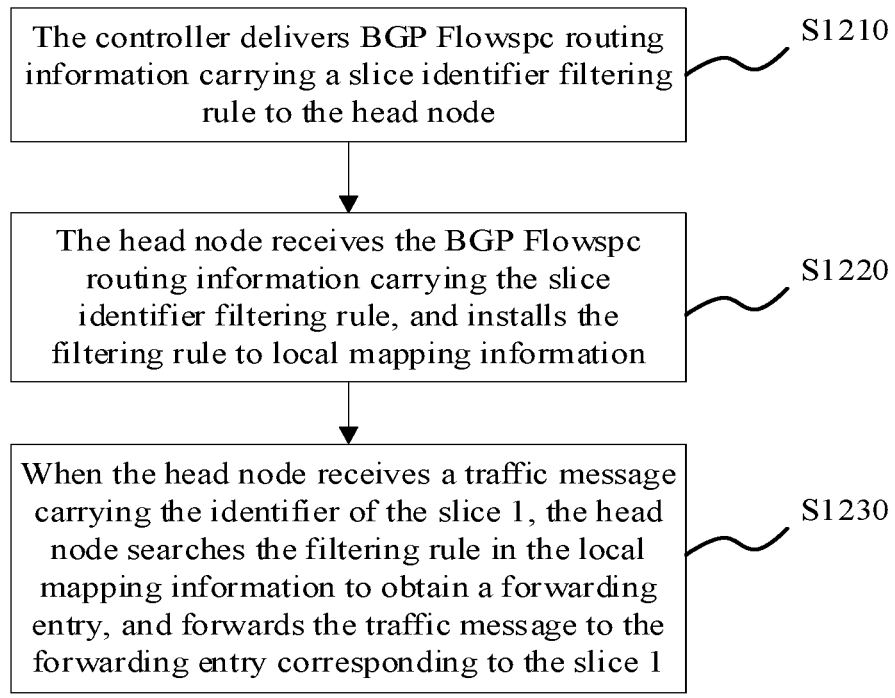
FIG. 12 is a flowchart of a traffic message forwarding method for redirecting to a slice according to an embodiment of the present disclosure.

FIG. 12 is a flowchart of a traffic message forwarding method according to an embodiment of the present disclosure. The traffic message forwarding method is applied to the network of FIG. 11, and includes, but not limited to, steps S1210, S1220, and S1230.

At S1210, the controller delivers BGP Flowspc routing information carrying a slice identifier filtering rule to the head node.

For example, the delivered BGP Flowspc routing information carrying an algorithm identifier filtering rule is as follows.

NLRI carries a matching condition, which may be a matching condition defined by RFC 5575, for example, a destination IP address of the traffic message (an IP address of the node D) or may be based on a slice identifier.

In this embodiment, for example, matching condition information carries an identifier of the slice 1.

Community attribute information redirected to a slice carries an execution action following traffic matching. In this embodiment, the community attribute information carries the identifier of the slice 1, which is used to indicate to send the traffic message to a corresponding path of the slice 1 after traffic matching.

At S1220, the head node receives the BGP Flowspc routing information carrying the slice identifier filtering rule, and installs the filtering rule to local mapping information.

At S1230, when the head node receives a traffic message carrying the identifier of the slice 1, the head node searches the filtering rule in the local mapping information for to find a forwarding entry, and forwards the traffic message to the forwarding entry corresponding to the slice 1.

For example, according to the filtering rule, the head node searches the local mapping information of the slice to find the forwarding entry corresponding to the slice 1. In this way, the head node can find an SR path corresponding to a plane of the slice 1.

Figure 13:
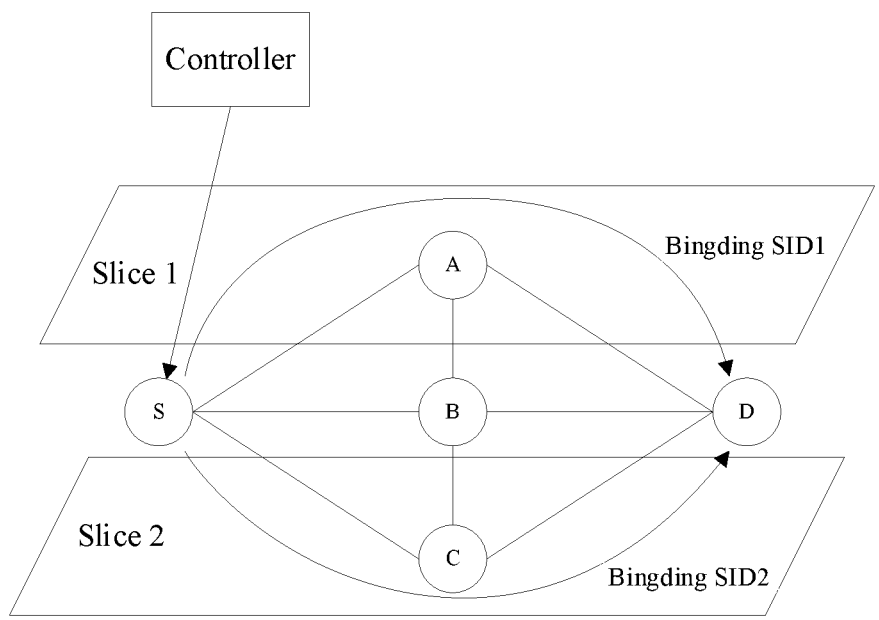
FIG. 13 is a schematic diagram of a traffic message forwarding network for redirecting to a slice according to another embodiment of the present disclosure.

As shown in FIG. 13, FIG. 13 is a schematic diagram of a traffic message forwarding network for redirecting to a slice according to another embodiment of the present disclosure. Nodes and a controller (equivalent to a border gateway controller) in the network all have a BGP Flowspc function. Two slices, namely, a slice 1 and a slice 2, are configured in the network. The slice 1 includes nodes S, A, B, and D, and bidirectional links connected between these nodes. The slice 2 includes nodes S, B, C, and D, and bidirectional links connected between these nodes. A slice filtering rule includes matching condition information and execution action information of an execution action following traffic matching. The matching condition information is a matching condition based on a slice identifier, i.e., a new slice BGP Flowspc Component type in NLRI is defined. The execution action information is an existing execution action, which may be redirecting to a tunnel or redirecting to a Tunnel ID or Binding SID. In FIG. 13, Binding SID 1 identifies an S-A-D path, and Binding SID 2 identifies an S-C-D path.

Figure 14:
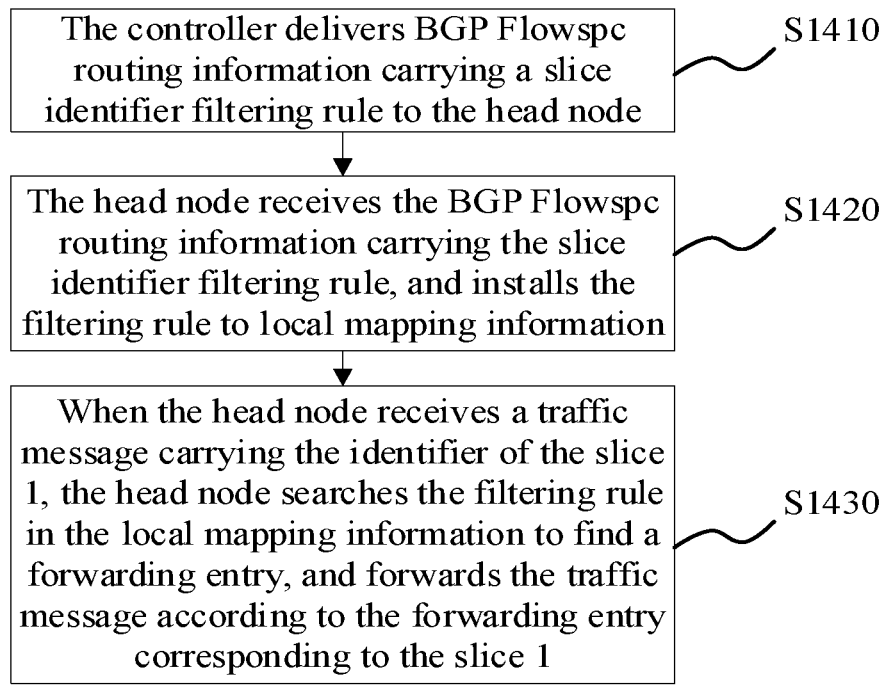
FIG. 14 is a flowchart of a traffic message forwarding method for redirecting to a slice according to another embodiment of the present disclosure.

FIG. 14 is a flowchart of a traffic message forwarding method according to an embodiment of the present disclosure. The traffic message forwarding method is applied to the network of FIG. 13, and includes, but not limited to, steps S1410, S1420, and S1430.

At S1410, the controller delivers BGP Flowspc routing information carrying a slice identifier filtering rule to the head node.

The filtering rule in this embodiment includes matching condition information and execution action information of an execution action following traffic matching. The matching condition information is based on a slice identifier, i.e., a new slice BGP Flowspc Component type in NLRI may be defined. The execution action information of the execution action following matching may be existing execution action information, which may indicate to determine a path by redirecting to a tunnel, or may indicate to determine a path by redirecting to a Tunnel ID or Binding SID.

At S1420, the head node receives the BGP Flowspc routing information carrying the slice identifier filtering rule, and installs the filtering rule to local mapping information.

The filtering rule after installation is shown in Table 1.

TABLE 1

| Matching condition information | Forward entry |
|---|---|
| Slice 1 | Binding SID 1 |
| Slice 2 | Binding SID 2 |

At S1430, when the head node receives a traffic message carrying the identifier of the slice 1, the head node searches the filtering rule in the local mapping information to find a forwarding entry, and forwards the traffic message according to the forwarding entry corresponding to the slice 1.

For example, according to the filtering rule, the head node searches local mapping information of the slice to determine the forwarding entry corresponding to the slice 1. In this way, the head node can find an SR path corresponding to a plane of the slice 1.

Figure 15:
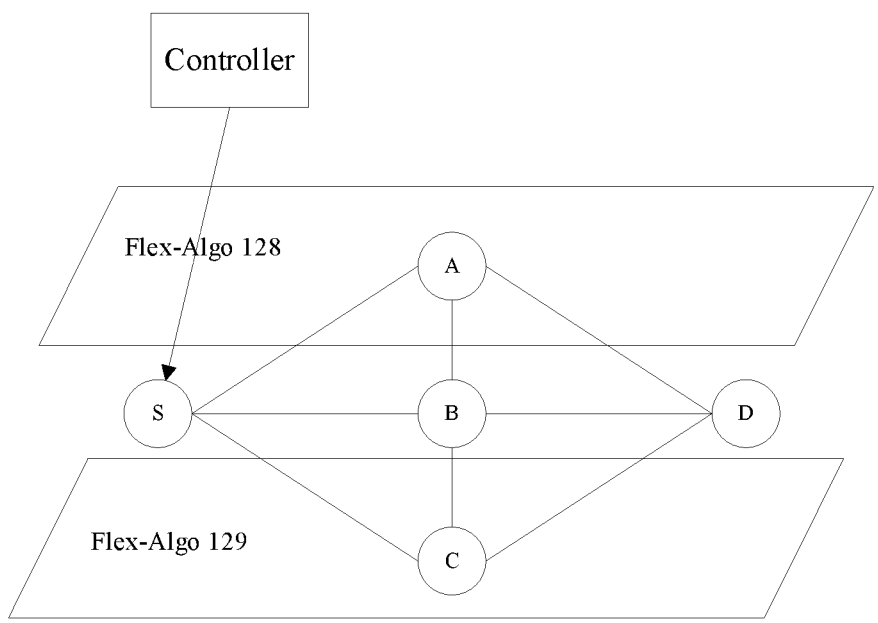
FIG. 15 is a schematic diagram of a traffic message forwarding network for redirecting to a slice according to another embodiment of the present disclosure.

As shown in FIG. 15, FIG. 15 is a schematic diagram of a traffic message forwarding network for redirecting to a slice according to another embodiment of the present disclosure. As shown in the figure, nodes and a controller (equivalent to a border gateway controller) in the network all have a BGP Flowspc function. Two Flex-Algo planes are configured in the network. An Algorithm value corresponding a Flex-Algo 128 plane is 128, and an Algorithm value corresponding to a Flex-Algo 129 plane is 129. The Flex-Algo 128 plane includes nodes S, A, B, and D, and bidirectional links between these nodes. The Flex-Algo 129 plane includes nodes S, B, C, and D, and bidirectional links connected between these nodes. A corresponding SR path is configured in each Flex-Algo plane.

Figure 16:
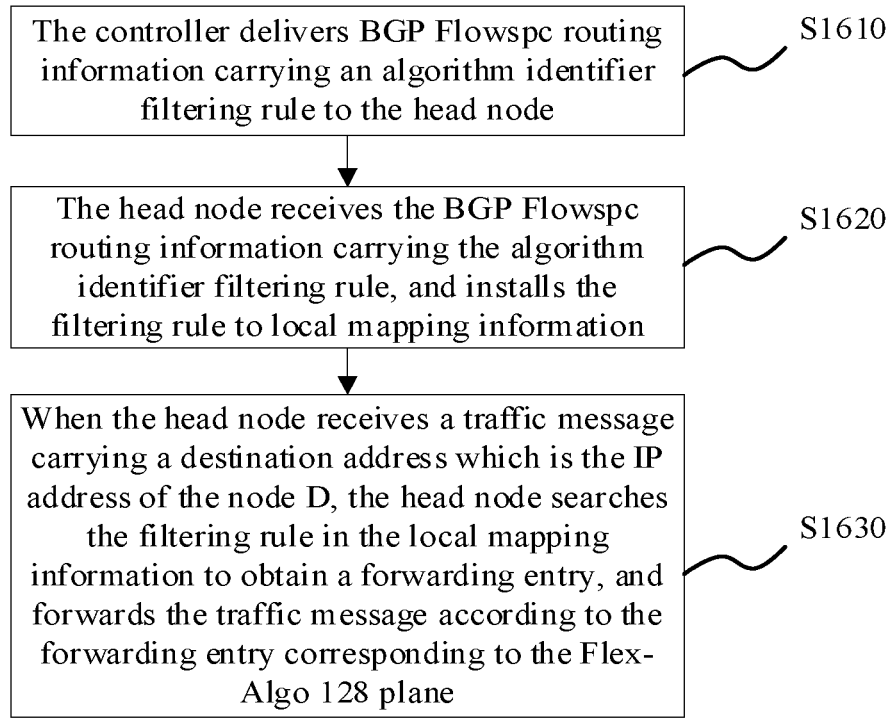
FIG. 16 is a flowchart of a traffic message forwarding method for redirecting to a slice according to another embodiment of the present disclosure.

FIG. 16 is a flowchart of a traffic message forwarding method according to an embodiment of the present disclosure. The traffic message forwarding method is applied to the network of FIG. 15, and includes, but not limited to, steps S1610, S1620, and S1630.

At S1610, the controller delivers BGP Flowspc routing information carrying an algorithm identifier filtering rule to the head node.

The BGP Flowspc routing information carrying the algorithm identifier (implicitly including a slice identifier) filtering rule delivered by the controller is as follows.

NLRI carries matching condition information. In this embodiment, the matching condition information may be a destination IP address of a traffic message (an IP address of the node D) or may be based on a flexible algorithm identifier.

Community attribute information redirected to a flexible algorithm carries execution action information of an execution action following traffic matching. In this embodiment, the community attribute information carries Flex-algo 128, which is used to indicate to send the traffic message to the path corresponding to the Flex-Algo 128 plane after traffic matching.

At S1620, the head node receives the BGP Flowspc routing information carrying the algorithm identifier filtering rule, and installs the filtering rule to local mapping information.

At S1630, when the head node receives a traffic message carrying a destination address which is the IP address of the node D, the head node searches the filtering rule in the local mapping information to obtain a forwarding entry, and forwards the traffic message according to the forwarding entry corresponding to the Flex-Algo 128 plane.

According to the filtering rule, the head node searches the local mapping information of the Flex-Algo plane to determine the forwarding entry corresponding to Flex-algo 128. In this way, the head node can find the SR path corresponding to the Flex-Algo 128 plane.

Figure 17:
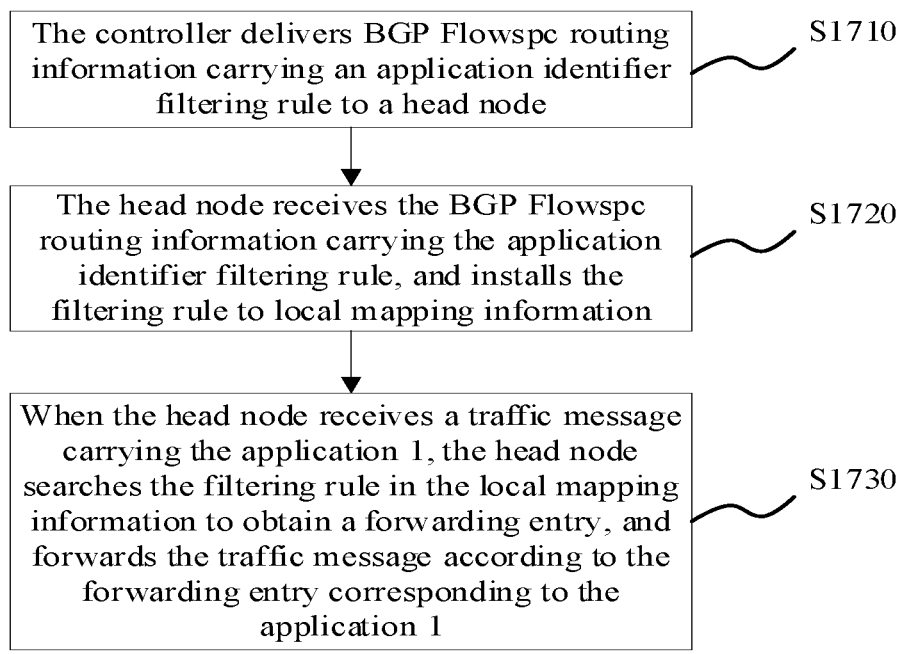
FIG. 17 is a flowchart of a traffic message forwarding method for redirecting to an application according to another embodiment of the present disclosure.

FIG. 17 is a schematic diagram of a traffic message forwarding method for redirecting to an application according to an embodiment of the present disclosure. When nodes and a controller (equivalent to a border gateway controller) in a network all have a BGP-FS function, two applications, namely, an application 1 and an application 2, are configured in the network. The applications may be App-related applications. The traffic message forwarding method includes, but not limited to, steps S1710, S1720, and S1730.

At S1710, the controller delivers BGP Flowspc routing information carrying an application identifier filtering rule to a head node.

For example, the BGP Flowspc routing information carrying the application identifier filtering rule delivered by the controller is as follows.

NLRI carries matching condition information, which may be matching condition information defined by RFC 5575, for example, a destination IP address of the traffic message (an IP address of the node D) or may be based on an application identifier.

In this embodiment, for example, the matching condition information carries an identifier of the application 1. Community attribute information redirected to the application 1 carries an execution action following traffic matching. In this embodiment, the community attribute information carries the identifier of the application 1, which is used to indicate to forward the traffic message according to a forwarding entry corresponding to the application 1 after traffic matching.

At S1720, the head node receives the BGP Flowspc routing information carrying the application identifier filtering rule, and installs the filtering rule to local mapping information.

At S1730, when the head node receives a traffic message carrying the application 1, the head node searches the filtering rule in the local mapping information to obtain a forwarding entry, and forwards the traffic message according to the forwarding entry corresponding to the application 1.

According to the filtering rule, the head node searches the local mapping information of the application 1 to determine the forwarding entry corresponding to the application 1. In this way, the head node can find an SR path corresponding to a plane of the application 1.

Based on the above traffic message forwarding methods, various embodiments of a border gateway client, a border gateway controller, and a computer-readable storage medium of the present disclosure are provided below respectively.

An embodiment of the present disclosure provides a border gateway client, including: a memory, a processor, and a computer program stored in the memory and executable by the processor.

The processor and the memory may be connected by a bus or in other ways.

It should be noted that the border gateway client in this embodiment may correspondingly include the memory and the processor in the embodiment shown in FIG. 1, and can constitute a part of the system architecture platform in the embodiment shown in FIG. 1. The two embodiments belong to the same inventive concept and therefore have the same implementation principle and technical effects, so the details will not be repeated here.

The non-transitory software program and instructions required to implement the traffic message forwarding method at the border gateway client side in the foregoing embodiments are stored in the memory which, when executed by the processor, cause the processor to implement the traffic message forwarding method in the foregoing embodiments, for example, implement the method steps S100 to S300 in FIG. 2, the method steps S710 to S720 in FIG. 7, the method steps S1020 and S1030 in FIG. 10, the method steps S1220 and S1230 in FIG. 12, the method steps S1420 and S1430 in FIG. 14, the method steps S1620 and S1630 in FIG. 16, or the method steps S1720 and S1730 in FIG. 17.

In addition, an embodiment of the present disclosure provides a border gateway controller, including: a memory, a processor, and a computer program stored in the memory and executable by the processor.

The processor and the memory may be connected by a bus or in other ways.

It should be noted that the border gateway controller in this embodiment may correspondingly include the memory and the processor in the embodiment shown in FIG. 1, and can constitute a part of the system architecture platform in the embodiment shown in FIG. 1. The two embodiments belong to the same inventive concept and therefore have the same implementation principle and technical effects, so the details will not be repeated here.

The non-transitory software program and instructions required to implement the traffic message forwarding method at the border gateway controller side in the foregoing embodiments are stored in the memory which, when executed by the processor, cause the processor to implement the traffic message forwarding method in the foregoing embodiments, for example, implement the method step S810 in FIG. 8, the method step S1010 in FIG. 10, the method step S1210 in FIG. 12, the method step S1410 in FIG. 14, the method step S1610 in FIG. 16, or the method step S1710 in FIG. 17.

In addition, an embodiment of the present disclosure provides a computer-readable storage medium, storing a computer-executable instruction which, when executed by a processor, causes the processor to implement the traffic message forwarding method at the border gateway client side, for example, implement the method steps S100 to S300 in FIG. 2, the method steps S710 to S720 in FIG. 7, the method steps S1020 and S1030 in FIG. 10, the method steps S1220 and S1230 in FIG. 12, the method steps S1420 and S1430 in FIG. 14, the method steps S1620 and S1630 in FIG. 16, or the method steps S1720 and S1730 in FIG. 17; or the traffic message forwarding method at the border gateway controller side, for example, implement the method step S810 in FIG. 8, the method step S1010 in FIG. 10, the method step S1210 in FIG. 12, the method step S1410 in FIG. 14, the method step S1610 in FIG. 16, or the method step S1710 in FIG. 17.

An embodiment of the present disclosure includes: receiving a traffic message; determining, when the traffic message includes a block resource identifier, a target block resource according to the block resource identifier and filtering rule information, where the filtering rule information is received from a border gateway controller; and forwarding the traffic message using the target block resource. According to the technical schemes of the embodiments of the present disclosure, when receiving a traffic message carrying a block resource identifier, a border gateway client can determine a target block resource according to the block resource identifier and filtering rule information received from a border gateway controller, and then forward the traffic message using the target block resource. Network resources can be segmented flexibly by using the block resource identifier, so that the traffic message can be forwarded using the target block resource determined according to the block resource identifier, thereby meeting users' requirements for traffic path adjustment and optimization.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some implementations of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. A traffic message forwarding method, comprising:
   receiving a traffic message;
   determining, in response to the traffic message comprising a block resource identifier, a target block resource according to the block resource identifier and filtering rule information, wherein the filtering rule information is received from a border gateway controller; and
   forwarding the traffic message using the target block resource, comprising:
   determining the target block resource by a border gateway client according to the block resource identifier in the traffic message and local mapping information installed with the filtering rule information, and forwarding the traffic message using the target block resource, wherein the local mapping information installed with the filtering rule information is obtained by extending the filtering rule information in the Border Gateway Protocol Flow Specification (BGP Flowspc) by adding the block resource identifier into a filtering rule, wherein the filtering rule information carrying the block resource identifier is sent from the border gateway controller to the border gateway client, and the filtering rule information carrying the block resource identifier is installed into the local mapping information by the border gateway client after receiving the filtering rule information carrying the block resource identifier.

2. The traffic message forwarding method of claim 1, wherein forwarding the traffic message using the target block resource comprises:
   determining a forwarding entry from local mapping information according to the target block resource, wherein the local mapping information comprises resource information corresponding to the target block resource and the forwarding entry corresponding to the resource information; and
   forwarding the traffic message according to the forwarding entry.

3. The traffic message forwarding method of claim 2, wherein the traffic message comprises community attribute information, and
   determining a forwarding entry from local mapping information according to the target block resource comprises:
   determining the forwarding entry from the local mapping information according to the target block resource and the community attribute information.

4. The traffic message forwarding method of claim 1, wherein the filtering rule information comprises matching condition information and execution action information, and the block resource identifier is carried by the matching condition information or the execution action information.

5. The traffic message forwarding method of claim 1, wherein the block resource identifier is a slice identifier or an application identifier.

6. A non-transitory computer-readable storage medium, storing a computer-executable instruction which, when executed by a processor, causes the processor to perform the traffic message forwarding method of claim 1.

7. The traffic message forwarding method of claim 2, wherein the filtering rule information comprises matching condition information and execution action information, and the block resource identifier is carried by the matching condition information or the execution action information.

8. The traffic message forwarding method of claim 3, wherein the filtering rule information comprises matching condition information and execution action information, and the block resource identifier is carried by the matching condition information or the execution action information.

9. The traffic message forwarding method of claim 2, wherein the block resource identifier is a slice identifier or an application identifier.

10. The traffic message forwarding method of claim 3, wherein the block resource identifier is a slice identifier or an application identifier.

11. A border gateway client, comprising:
a memory, a processor, and a computer program stored in the memory and executable by the processor, wherein the computer program, when executed by the processor, causes the processor to perform a traffic message forwarding method, comprising:
receiving a traffic message;
determining, in response to the traffic message comprising a block resource identifier, a target block resource according to the block resource identifier and filtering rule information, wherein the filtering rule information is received from a border gateway controller; and
forwarding the traffic message using the target block resource, comprising:
determining the target block resource by a border gateway client according to the block resource identifier in the traffic message and local mapping information installed with the filtering rule information, and forwarding the traffic message using the target block resource, wherein the local mapping information installed with the filtering rule information is obtained by extending the filtering rule information in the Border Gateway Protocol Flow Specification (BGP Flowspc) by adding the block resource identifier into a filtering rule, wherein the filtering rule information carrying the block resource identifier is sent from the border gateway controller to the border gateway client, and the filtering rule information carrying the block resource identifier is installed into the local mapping information by the border gateway client after receiving the filtering rule information carrying the block resource identifier.

12. A traffic message forwarding method, comprising:
sending filtering rule information carrying a block resource identifier to a border gateway client, so that the border gateway client determines a target block resource of a traffic message according to the filtering rule information, and forwards the traffic message according to the target block resource, wherein the traffic message is received by the border gateway client;
forwarding the traffic message according to the target block resource comprising: determining the target block resource by a border gateway client according to the block resource identifier in the traffic message and local mapping information installed with the filtering rule information, and forwarding the traffic message using the target block resource, wherein the local mapping information installed with the filtering rule information is obtained by extending the filtering rule information in the Border Gateway Protocol Flow Specification (BGP Flowspc) by adding the block resource identifier into a filtering rule, wherein the filtering rule information carrying the block resource identifier is sent from the border gateway controller to the border gateway client, and the filtering rule information carrying the block resource identifier is installed into the local mapping information by the border gateway client after receiving the filtering rule information carrying the block resource identifier.

13. The traffic message forwarding method of claim 12, wherein the filtering rule information comprises matching condition information and execution action information, and the block resource identifier is carried by the matching condition information or the execution action information.

14. The traffic message forwarding method of claim 12, wherein the block resource identifier is a slice identifier or an application identifier.

15. A border gateway controller, comprising:
a memory, a processor, and a computer program stored in the memory and executable by the processor, wherein the computer program, when executed by the processor, causes the processor to perform the traffic message forwarding method of claim 7.

16. A non-transitory computer-readable storage medium, storing a computer-executable instruction which, when executed by a processor, causes the processor to perform the traffic message forwarding method of claim 12.

* * * * *